US011973566B2

United States Patent
Cosic et al.

(10) Patent No.: US 11,973,566 B2
(45) Date of Patent: Apr. 30, 2024

(54) WIRELESS RADIO REPEATER FOR ELECTRIC POWER DISTRIBUTION SYSTEM

(71) Applicant: Schweitzer Engineering Laboratories, Inc., Pullman, WA (US)

(72) Inventors: Miralem Cosic, Spokane, WA (US); Raymond W. Rice, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 112 days.

(21) Appl. No.: 17/074,929

(22) Filed: Oct. 20, 2020

(65) Prior Publication Data

US 2022/0116103 A1 Apr. 14, 2022

Related U.S. Application Data

(60) Provisional application No. 63/089,849, filed on Oct. 9, 2020.

(51) Int. Cl.
*H04B 7/155* (2006.01)
*G06Q 50/06* (2012.01)

(52) U.S. Cl.
CPC ......... *H04B 7/15507* (2013.01); *G06Q 50/06* (2013.01)

(58) Field of Classification Search
None
See application file for complete search history.

(56) References Cited

U.S. PATENT DOCUMENTS 3,239,678 A * 3/1966 Kolm ...................... F23Q 2/287
  102/210
4,829,239 A * 5/1989 Holstein ................ G01R 21/08
  324/111

(Continued)

FOREIGN PATENT DOCUMENTS

CA 2540774 A1 * 9/2006 ............. G01D 4/006
CA 2240514 C * 11/2008 ......... G01R 21/1333

(Continued)

OTHER PUBLICATIONS

I. B. Vendik, I. Steblevska, V. A. Gerasimov, S. Y. Dudnikov, L. M. Selivanov and A. A. Uhov, "Energy harvesting for wireless sensors from power lines electric field," 2017 IEEE International Conference on RFID Technology & Application (RFID-TA), 2017, pp. 125-128, doi: 10.1109/RFID-TA.2017.8098863.*

(Continued)

*Primary Examiner* — Berhanu Tadese
(74) *Attorney, Agent, or Firm* — Fletcher Yoder, LLC (57) ABSTRACT

Systems, devices, and methods are provided for a wireless radio repeater for integration in an electric power distribution system. Such a system may include an electrical measurement device and a wireless radio repeater. The electrical measurement device may be installed on a power line of an electric power distribution system, obtain an electrical measurement of the power line of the electric power distribution system, and transmit a wireless message indicating the electrical measurement. The wireless radio repeater may receive the wireless message from the electrical measurement device and re-transmit the wireless message to a control system of the electric power distribution system or to another wireless radio repeater to assist in sending the wireless message to the control system of the electric power distribution system.

22 Claims, 4 Drawing Sheets

(56) References Cited

U.S. PATENT DOCUMENTS

| | | | | |
|---|---|---|---|---|
| 5,293,323 A * | 3/1994 | Doskocil | G06F 11/2273 | 714/25 |
| 5,465,399 A * | 11/1995 | Oberholtzer | H04W 52/288 | 455/67.11 |
| 5,479,095 A * | 12/1995 | Michalek | G01R 15/202 | 324/117 R |
| 5,608,306 A * | 3/1997 | Rybeck | H02J 7/00036 | 429/61 |
| 5,726,644 A * | 3/1998 | Jednacz | H04W 52/283 | 340/3.41 |
| 5,861,684 A * | 1/1999 | Slade | H02J 1/06 | 307/66 |
| 5,862,186 A * | 1/1999 | Kumar | H04B 1/707 | 375/142 |
| 6,029,074 A * | 2/2000 | Irvin | H04W 52/0212 | 455/574 |
| 6,046,582 A * | 4/2000 | Sanelli | G01R 15/125 | 324/126 |
| 6,112,159 A * | 8/2000 | Bond | G01R 31/66 | 702/65 |
| 6,304,176 B1 * | 10/2001 | Discenzo | G08C 17/00 | 340/506 |
| 6,492,910 B1 * | 12/2002 | Ragle | H04Q 9/00 | 702/57 |
| 6,657,418 B2 * | 12/2003 | Atherton | H02M 5/293 | 323/237 |
| 6,816,439 B1 * | 11/2004 | Kawahara | G04G 19/08 | 368/64 |
| 6,894,478 B1 * | 5/2005 | Fenske | H02H 3/006 | 324/117 R |
| 6,901,242 B2 * | 5/2005 | Kroeger | H04L 1/02 | 455/60 |
| 7,060,379 B2 * | 6/2006 | Speranza | H01M 10/465 | 429/432 |
| 7,103,786 B2 * | 9/2006 | Chen | G06F 1/3203 | 713/320 |
| 7,132,763 B2 * | 11/2006 | Rendic | G06F 1/266 | 307/31 |
| 7,170,194 B2 * | 1/2007 | Korcharz | H02J 9/061 | 307/45 |
| 7,224,272 B2 * | 5/2007 | White, II | H04B 3/58 | 340/310.17 |
| 7,274,168 B2 * | 9/2007 | Tskukamoto | H02J 7/00047 | 320/106 |
| 7,315,169 B1 * | 1/2008 | Fenske | G01R 31/58 | 340/657 |
| 7,339,353 B1 * | 3/2008 | Masias | H02J 7/007 | 320/138 |
| 7,369,950 B2 * | 5/2008 | Wall | G06Q 30/04 | 702/57 |
| 7,382,272 B2 * | 6/2008 | Feight | H04B 10/1141 | 340/657 |
| 7,385,374 B2 * | 6/2008 | Frantz | H02J 7/0013 | 320/101 |
| 7,398,101 B2 * | 7/2008 | Zinn | H04W 52/48 | 455/39 |
| 7,411,371 B2 * | 8/2008 | Hobbs | B60L 53/305 | 320/128 |
| 7,412,338 B2 * | 8/2008 | Wynans | G01R 22/063 | 700/286 |
| 7,667,482 B2 * | 2/2010 | Mort | H02J 50/10 | 324/508 |
| 7,729,405 B2 * | 6/2010 | Inoue | H04B 1/7172 | 375/150 |
| 7,948,352 B2 * | 5/2011 | Tang | H02J 50/12 | 340/687 |
| 7,983,230 B1 * | 7/2011 | Li | H04W 52/267 | 370/445 |
| 8,103,463 B2 * | 1/2012 | Kalgren | G01D 18/00 | 702/182 |
| 8,427,131 B2 * | 4/2013 | Bryson | G06F 1/26 | 307/103 |
| 8,650,411 B2 * | 2/2014 | Feight | H02J 1/10 | 363/64 |
| 9,386,529 B2 * | 7/2016 | Swartzendruber | H04W 52/0261 | |
| 9,685,992 B2 * | 6/2017 | Bennett | H04B 5/0031 | |
| 9,699,785 B2 * | 7/2017 | Henry | H04B 10/25759 | |
| 9,930,668 B2 * | 3/2018 | Barzegar | H04B 7/15542 | |
| 9,999,038 B2 * | 6/2018 | Barzegar | H04L 5/0003 | |
| 10,009,065 B2 * | 6/2018 | Henry | H04B 10/25753 | |
| 10,020,844 B2 * | 7/2018 | Bogdan | H04L 12/413 | |
| 10,359,749 B2 * | 7/2019 | Bogdan | H02J 13/00028 | |
| 10,419,064 B2 * | 9/2019 | Cosic | H04L 43/10 | |
| 10,439,675 B2 * | 10/2019 | Johnson | H04B 3/56 | |
| 10,520,966 B2 * | 12/2019 | Veda | H02J 13/00 | |
| 10,534,377 B2 * | 1/2020 | Dolezilek | H04L 12/42 | |
| 10,587,198 B2 * | 3/2020 | Herbert | H03K 3/017 | |
| 10,656,181 B2 * | 5/2020 | Sobolewski | G01R 1/44 | |
| 10,755,542 B2 * | 8/2020 | Bogdan | G08B 13/19656 | |
| 11,175,314 B2 * | 11/2021 | Brehm | G08B 5/36 | |
| 11,209,465 B2 * | 12/2021 | Hao | H02J 13/00002 | |
| 11,215,980 B2 * | 1/2022 | Cella | G06N 3/088 | |
| 11,221,613 B2 * | 1/2022 | Cella | H03M 13/353 | |
| 11,231,733 B2 * | 1/2022 | Veda | H02J 13/00034 | |
| 2001/0054878 A1 * | 12/2001 | Odaohhara | H02J 7/0025 | 320/118 |
| 2003/0020332 A1 * | 1/2003 | Giannopoulos | H02J 50/80 | 307/18 |
| 2003/0111908 A1 * | 6/2003 | Christensen | H02J 1/10 | 307/43 |
| 2004/0036359 A1 * | 2/2004 | Griffith | H02J 1/102 | 307/43 |
| 2004/0078606 A1 * | 4/2004 | Chen | G06F 1/3203 | 713/300 |
| 2004/0256915 A1 * | 12/2004 | Phinney | H02M 7/06 | 307/43 |
| 2005/0006956 A1 * | 1/2005 | Shi | H02J 1/102 | 307/43 |
| 2005/0128057 A1 * | 6/2005 | Mansfield | G08B 25/10 | 340/3.5 |
| 2005/0168326 A1 * | 8/2005 | White, II | H04B 3/56 | 375/211 |
| 2005/0253560 A1 * | 11/2005 | Popescu-Stanesti | H02J 1/08 | 320/138 |
| 2006/0077607 A1 * | 4/2006 | Henricks | H02H 3/042 | 361/93.1 |
| 2007/0269219 A1 * | 11/2007 | Teller | H04B 10/803 | 398/140 |
| 2008/0122518 A1 * | 5/2008 | Besser | H02J 3/381 | 327/518 |
| 2008/0174278 A1 * | 7/2008 | Masias | H02J 7/007 | 320/138 |
| 2008/0287082 A1 * | 11/2008 | Govindswamy | H04W 48/16 | 455/500 |
| 2009/0240449 A1 * | 9/2009 | Gibala | G01R 22/063 | 702/62 |
| 2009/0243796 A1 * | 10/2009 | Tieman | B60R 25/406 | 340/5.72 |
| 2010/0013632 A1 * | 1/2010 | Salewske | G01R 19/2513 | 340/540 |
| 2010/0084920 A1 * | 4/2010 | Banting | G01R 15/142 | 307/104 |
| 2010/0085036 A1 * | 4/2010 | Banting | G01R 19/2513 | 702/188 |
| 2010/0138066 A1 * | 6/2010 | Kong | G06Q 30/0601 | 705/317 |
| 2010/0280775 A1 * | 11/2010 | Schafer | H02J 13/00034 | 307/104 |
| 2011/0001485 A1 * | 1/2011 | Feight | H02J 1/10 | 307/43 |
| 2013/0043788 A1 * | 2/2013 | O'Brien | F21V 23/0435 | 315/360 |
| 2013/0187637 A1 * | 7/2013 | Saxby | G01R 15/142 | 324/127 |
| 2013/0234696 A1 * | 9/2013 | Bryson | G06F 1/26 | 323/340 |
| 2013/0301683 A1 * | 11/2013 | Sinsuan | H04L 1/1867 | 375/145 |

(56) References Cited

U.S. PATENT DOCUMENTS

| | | | | |
|---|---|---|---|---|
| 2014/0064162 | A1* | 3/2014 | Swartzendruber | H04W 52/0261 370/311 |
| 2014/0119331 | A1* | 5/2014 | Ji | H04W 72/02 370/336 |
| 2014/0251478 | A1* | 9/2014 | Dolezilek | G05D 7/067 137/861 |
| 2014/0351010 | A1* | 11/2014 | Kong | G06Q 30/0201 705/7.29 |
| 2015/0163867 | A1* | 6/2015 | Recker | H05B 47/125 315/250 |
| 2015/0244121 | A1* | 8/2015 | Amelio | G06Q 10/063 439/620.21 |
| 2016/0209445 | A1* | 7/2016 | McCammon | G01R 31/08 |
| 2016/0330825 | A1* | 11/2016 | Recker | H05B 47/115 |
| 2016/0359530 | A1* | 12/2016 | Bennett | H04B 3/56 |
| 2017/0162320 | A1* | 6/2017 | Rumrill | H01F 38/30 |
| 2017/0223807 | A1* | 8/2017 | Recker | H02J 9/02 |
| 2018/0143234 | A1* | 5/2018 | Saxby | G01R 31/58 |
| 2018/0203472 | A1* | 7/2018 | Dolezilek | G05D 7/0641 |
| 2018/0284735 | A1* | 10/2018 | Cella | G01M 13/045 |
| 2018/0321285 | A1* | 11/2018 | Keister | H05K 9/0081 |
| 2019/0121350 | A1* | 4/2019 | Cella | G06N 3/044 |
| 2019/0331722 | A1* | 10/2019 | Hao | G01R 31/58 |
| 2020/0191841 | A1* | 6/2020 | Lakirovich | G01R 19/2513 |
| 2020/0226895 | A1* | 7/2020 | Masters | G08B 25/08 |
| 2021/0102981 | A1* | 4/2021 | Mobley | G01R 15/26 |
| 2021/0109136 | A1* | 4/2021 | Hao | G01R 19/0092 |
| 2021/0109137 | A1* | 4/2021 | Hao | G01R 19/14 |
| 2021/0109138 | A1* | 4/2021 | Blair | G05B 15/02 |
| 2021/0109141 | A1* | 4/2021 | Hao | G01R 15/26 |
| 2021/0231736 | A1* | 7/2021 | Achanta | G01R 31/3333 |
| 2021/0350960 | A1* | 11/2021 | Rostron | G01R 31/1236 |
| 2022/0116103 | A1* | 4/2022 | Cosic | H04B 7/15507 |

FOREIGN PATENT DOCUMENTS

| | | | | |
|---|---|---|---|---|
| CA | 3062681 | A1 | * | 6/2020 ......... G01R 19/0092 |
| CN | 201583604 | U | * | 9/2010 |
| CN | 103293362 | A | * | 9/2013 |
| CN | 103293362 | B | * | 12/2015 |
| CN | 103487629 | B | * | 9/2016 ............ G01R 1/22 |
| CN | 106953527 | A | * | 7/2017 ........... G01R 15/146 |
| CN | 106953527 | B | * | 8/2020 ........... G01R 15/146 |
| CN | 107677867 | B | * | 1/2021 ............. G01R 1/30 |
| CN | 112868191 | A | * | 5/2021 ......... H04B 10/1149 |
| DE | 4331796 | A1 | * | 3/1995 ............ G01R 15/09 |
| DE | 69832556 | T2 | * | 8/2006 ......... G01R 21/1333 |
| DE | 102015226430 | A1 | * | 6/2017 ........... G01R 15/146 |
| DE | 102020118110 | A1 | * | 1/2021 |
| EP | 1703289 | A1 | * | 9/2006 ............ G01D 4/006 |
| EP | 1703289 | B1 | * | 11/2010 ............ G01D 4/006 |
| EP | 3264107 | A1 | * | 1/2018 ............. G01R 1/30 |
| EP | 3264107 | B1 | * | 3/2019 ............. G01R 1/30 |
| EP | 2885647 | B1 | * | 1/2022 ........... G01R 15/202 |
| JP | 2018157630 | A | * | 10/2018 ......... G01M 11/081 |
| JP | 6903963 | B2 | * | 7/2021 ......... G01M 11/081 |
| WO | WO-2014191776 | A1 | * | 12/2014 ......... G01R 15/144 |
| WO | WO-2015196193 | A1 | * | 12/2015 ............. G05F 1/66 |
| WO | WO-2017158385 | A1 | * | 9/2017 ............ G01R 15/14 |
| WO | WO-2018168078 | A1 | * | 9/2018 ......... G01M 11/081 |

OTHER PUBLICATIONS

Y. Mahamat, S. R. Hussain and A. Eroglu, "Far-field RF energy harvesting system for distribution power lines," 2016 IEEE/ACES International Conference on Wireless Information Technology and Systems (ICWITS) and Applied Computational Electromagnetics (ACES), 2016, pp. 1-2, doi: 10.1109/ROPACES.2016.7465303.*
Vendik et al. Energy Harvesting for Wireless Sensors from Electric Field of Power Lines, IEEE 2017 (Year: 2017).*
Mahamat et al, Far-field RF energy harvesting system for distribution power lines, IEEE 2016 (Year: 2016).*
Rengaraju et al, "Communication requirements and analysis of distribution networks using WiMAX technology for smart grids," 2012 8th International Wireless Communications and Mobile Computing Conference (IWCMC), Limassol, Cyprus, 2012, pp. 666-670 (Year: 2012).*
Y. J. Song and K. Sarabandi, "Miniaturized Radio Repeater for Enhanced Wireless Connectivity of Ad-Hoc Networks," in IEEE Transactions on Antennas and Propagation, vol. 60, No. 8, pp. 3913-3920, Aug. 2012, doi: 10.1109/TAP.2012.2201124. (Year: 2012).*

* cited by examiner

WIRELESS RADIO REPEATER FOR ELECTRIC POWER DISTRIBUTION SYSTEM

RELATED APPLICATION

This application claims the benefit under 35 U.S.C. § 119(e) of U.S. Provisional Application No. 63/089,849 filed Oct. 9, 2020, which is hereby incorporated by reference in its entirety.

BACKGROUND

This disclosure relates to communication for an electrical distribution system and, more particularly, to communication around communication barriers or obstacles.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power distribution systems carry electricity from a transmission system to residential communities, factories, industrial areas, and other electricity consumers. To monitor power distribution, electrical measurement devices on the electric power distribution system may use electrical sensors to obtain electrical measurements that may be used to determine one or more aspects of the electricity being transferred through a power line (e.g., a load direction). Such electrical measurements may be useful when determining control actions that should be taken on the electric power distribution system. The electrical measurements may be wirelessly transmitted to a control system; however, structures and obstacles may impede a successful transmission of data of the electrical measurements from the electrical measurement devices and to the control system location. Without information of the electrical measurements at the control location, it may be difficult to determine an immediate control action on the electric power distribution system.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In one example, a system may include an electrical measurement device and a wireless radio repeater. The electrical measurement device may be installed on a power line of an electric power distribution system, obtain an electrical measurement of the power line of the electric power distribution system, and transmit a wireless message indicating the electrical measurement. The wireless radio repeater may receive the wireless message from the electrical measurement device and re-transmit the wireless message to a control system of the electric power distribution system or to another wireless radio repeater to assist in sending the wireless message to the control system of the electric power distribution system.

In another example, a wireless radio repeater may include a coupling to attach the wireless radio repeater to a power line of an electric power distribution system, a current transformer to harvest electrical energy from the power line, an antenna to receive a wireless message, and wireless communication circuitry powered at least in part by the harvested electrical energy. The wireless communication circuitry may cause the antenna to re-transmit the wireless message.

In another example, an article of manufacture may include one or more tangible, non-transitory, computer-readable media having stored thereon instructions that, when executed, cause a processor to receive and transmit a wireless message. The wireless message may be received via an antenna of a wireless radio repeater coupled to a power line of an electric power distribution system. The wireless message may include data that indicates an electrical property of a component of the electric power distribution system. The wireless message may be transmitted via the antenna of the wireless radio repeater to be sent to the wireless message to a control system of the electric power distribution system or to another wireless radio repeater to assist in sending the wireless message to the control system of the electric power distribution system.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

Moreover, the embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

In addition, several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Thus, embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

As mentioned above, electric power distribution systems carry electricity from a transmission system to residential communities, factories, industrial areas, and other electricity consumers. To monitor power distribution, electrical measurement devices on the electric power distribution system may use electrical sensors to obtain electrical measurements that may be used to determine aspects (e.g., load direction, fault, etc.) of the electrical power. Such electrical measurements may be used in providing better load-balancing, improving power quality and efficiency, and responding to potential dangers (e.g., a fault) that may be indicated by the electrical measurements.

Electrical measurement devices may transmit the electrical measurements to a control system. The controller system may control one or more aspects of the electric power distribution system. Because electrical measurement devices may be dispersed across the electric power distribution system, many electrical measurement devices may send the electrical measurements that they obtain to the control system using radio communications. However, reliable transmission of the measurement data over a distance via radio waves may depend upon many factors. These factors may include the amount of power used to transmit the radio signal, sizes of antennas used between communication nodes, heights of the antennas above ground level, distances between antennas, or environmental obstacles or obstructions between antennas (e.g., vegetation, buildings, and hills), to name a few. Indeed, some obstructions could cause unreliable or incomplete transmission of the electrical measurement data. Indeed, some of these obstacles may reflect, deflect, or absorb radio waves such that electrical measurement data transmitted via radio waves may not arrive at the desired location.

Wireless radio repeaters, which may be standalone devices installed on the electric power distribution system or integrated into sensors on the electric power distribution system, may be used to route around obstacles in the electric power distribution system. The wireless radio repeaters may increase a reliability of transmission and reception of radio signals from wireless electrical measurement devices to a control system of the electric power distribution system. The wireless radio repeaters may reliably re-transmit and receive valuable or sensitive data (e.g., electrical measurement data related to an operation of a component of an electric power distribution system). To this end, the wireless radio repeaters may be placed in strategic locations to provide line of sight transmission and reception of signals. A wireless radio repeater may receive a wireless message from an electrical measurement device or another wireless radio repeater. The wireless radio repeater may re-transmit the message to a control system of the electric power distribution system or to another wireless radio repeater to assist in sending the wireless message to the control system of the electric power distribution system.

The wireless radio repeaters may receive radio messages carrying electrical measurement data from electrical measurement devices. The wireless radio repeaters may determine a frequency at which to re-transmit the messages. For example, the wireless radio repeater may receive a message at a first frequency (e.g., in a first frequency band) and re-transmit the message at a second frequency (e.g., a second frequency band). In addition, wireless radio repeaters may be relatively easy to install by coupling to the powerline (e.g., hanging on the power line), which may be much more cost effective than installing complex cabinetry or other structures (e.g., on a power pole). Being coupled to the power line in this way, the wireless radio repeaters may harvest energy wirelessly from the power line.

Some electrical measurement devices may also have integrated radio repeaters. These electrical measurement devices may both obtain electrical measurements to send to a control system of the electrical distribution system, and may also re-transmit wireless messages received from other electrical measurement devices and/or wireless radio repeaters.

Figure 1:
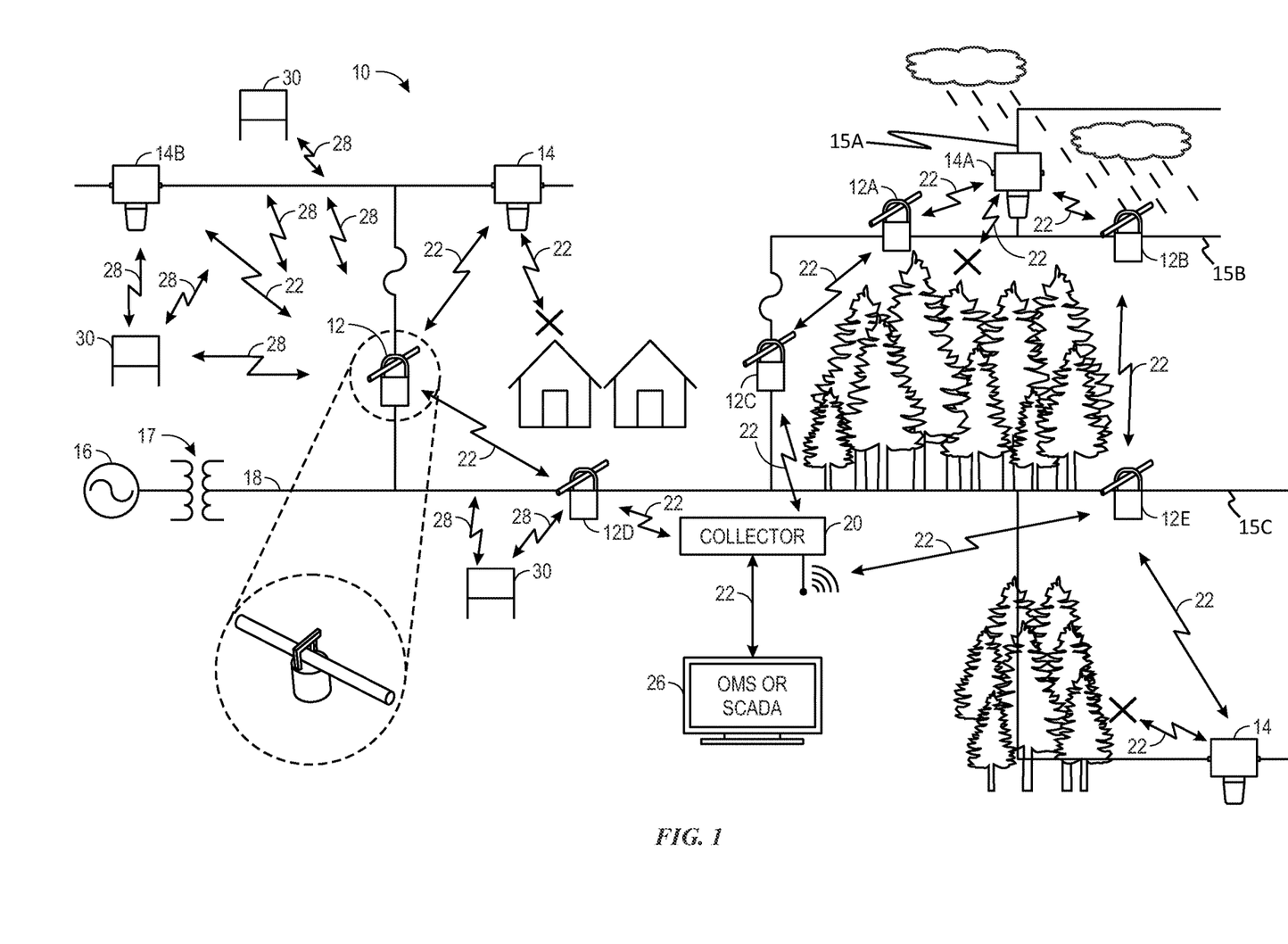
FIG. 1 is a schematic diagram of an electric power distribution system with wireless line sensors that use having wireless radio repeaters integrated in the electric power distribution system to transmit electrical measurements to a control system of the electric power distribution system, in accordance with an embodiment.

Turning to the drawings, FIG. 1 is a schematic diagram of an electric power distribution system 10 with wireless radio repeaters 12 and wireless line sensors 14 disposed in various locations (e.g., on various power lines 15), in accordance with an embodiment. The electric power distribution system 10 may receive electric power from a variety of generators 16. For example, electric power is shown in FIG. 1 as generated by a generator 16. A transformer 17 may step up or step down voltage from the generator 16 as specified for transmission through a distribution line 18. Dispersed at various locations throughout distribution lines 18 of the electric power distribution system 10 are wireless line sensors 14, some of which may have integrated wireless radio repeaters. The wireless line sensors 14 (e.g., electrical measurement devices) may be able to obtain certain electrical measurements at the various locations of the electric power distribution system 10. For example, the wireless line sensors 14 may measure electrical current and/or voltage. The wireless line sensors 14 may wirelessly transmit electrical measurements to a wireless line sensor collector 20 via radio signals 22 (e.g., signals in the radio frequency range of the electromagnetic spectrum). The wireless line sensor collector 20 may also communicate via radio signals 22 or via a wired communication medium(not shown) with a control system such as an Outage Management System (OMS) or Supervisory Control and Data Acquisition (SCADA) system 26 located apart from the power lines(s) on which a wireless line sensor 14 is installed. In some cases, the wireless line sensor collector 20 may be a component of or integrated into the control system of the electric power distribution system. The radio signals 22 may be understood to be sent to or from the control system of the electric power distribution system. In one example, the radio signals 22 may contain electrical measurement data captured at a wireless line sensor 14. The electrical measurement data may be re-transmitted to a wireless radio repeater 12, which may re-transmit the radio signals 22 to the wireless line sensor collector 20, which may re-transmit the radio signals to the OMS or SCADA system 26. In another example, the radio signals 22 may contain control commands (or other data) that may be transmitted from the OMS or SCADA system 26 and received or re-transmitted at the wireless line sensor collector 20, wireless line sensor 14, or wireless radio repeater 12.

The wireless line sensors 14, the wireless line sensor collector 20, and/or the OMS or SCADA system 26 may use the electrical measurements obtained by the wireless line sensors 14 to determine properties of the electric power distribution system 10 in specific locations of the electric power distribution system 10. For example, measurement data indicative of a low amount of current for a period of time may indicate the presence of a fault in the electric power distribution system 10. The wireless line sensors 14 may report the current level or report an alert that is indicative of a property of the electric power distribution system 10.

In the illustrated embodiment, the wireless line sensors 14 are disposed in a plurality of locations on the electric power distribution system 10. Wireless line sensors 14 may attempt to communicate wirelessly via the radio signals 22 to the wireless line sensor collector 20. The radio signals 22 may be directly transmitted to and/or from a collector system (e.g., the wireless line sensor collector 20) and, by extension, to and/or from the control system of the electric power distribution system. However, obstacles and/or obstructions may be present between a line-of-sight communication path of wireless line sensors 14 and the wireless line sensor collector 20. These obstacles, which may include structural obstacles (e.g., homes, commercial buildings, trees, and hills), may attenuate and thus decrease a reliability of a radio signal from the wireless line sensor 14 and to the wireless line collector 20. Moreover, some electric distribution systems may span vast distances, which may also substantially attenuate radio signals. To mitigate the effects of signal attenuation due to obstacles and/or distances, dispersed throughout the electric power distribution system 10 are wireless radio repeaters 12 and/or wireless line sensors 14 that have integrated wireless radio repeaters. In this way, the wireless line sensors 14 may communicate via radio signals 22 to other electrical devices on the electric power distribution system 10.

In the illustrated embodiment, the wireless radio repeaters 12 are strategically placed so as to provide a line of sight communication path to another communication node (e.g., another wireless radio repeater 12, another wireless line sensor 14, the wireless line sensor collector 20, the OMS or SCADA system 26). The wireless radio repeaters 12 may also be strategically placed so as to decrease signal attenuation due to a distance in between a wireless line sensor 14 and a wireless line sensor collector 20 exceeding a threshold distance, for example. In this way, the wireless line sensors 14 may communicate, via radio signals 22, to a communication node that is closer in proximity and/or has a line of sight communication path to a destination communication node or another communication node that may be able to receive and re-transmit (e.g., repeat) radio signals comprising electrical measurements sampled at a wireless line sensor 14.

For example, wireless line sensor 14A (e.g., installed on a first power line 5A) may report electrical measurement data it samples to the wireless line sensor collector 20. As illustrated, forestry lies in between a direct communication path of radio signals 22 (e.g., data packets) originating at the wireless line sensor 14A and ending at the wireless line sensor collector 20. Such obstacles may impede a successful transmission of electrical measurement data sampled at the wireless line sensor 14A. The wireless line sensor 14A may transmit radio signals 22 to the wireless radio repeater 12A and/or the wireless radio repeater 12B (e.g., installed on a second power line 15B), since the wireless line sensor 14A has a line of sight communication path with both the wireless radio repeater 12A and the wireless radio repeater 12B. If the wireless line sensor 14A transmits the radio signals 22 to the wireless radio repeater 12A, then the wireless radio repeater 12A may receive the radio signals 22 and then re-transmit the radio signals 22 comprising the data of electrical measurements captured at the wireless line sensor 14A to a wireless radio repeater 12C. The wireless radio repeater 12C may then re-transmit (e.g., repeat, broadcast) the radio signals 22 to the wireless line sensor collector 20 (e.g., located apart from the first power line 15C). The wireless radio repeater 12B may re-transmit the radio signals 22 to a wireless ine sensor collector 20.

The wireless radio repeaters 12 may be strategically placed along specific locations of the electric power distribution system 10 so as to minimize the number of obstructions or obstacles (e.g., hills, buildings, vegetation etc.) that may decrease a reliability of transmission of the radio signals 22. Indeed, instead of communicating to a destination with obstacles in the path of communication from the transmitter node to the receiver node, the wireless radio repeaters 12 may receive and repeat data packets that are sent from other wireless line sensors 14 and other wireless radio repeaters 12. In this way, the reliability of the transmission of data between communication nodes is increased.

The wireless radio repeaters 12 may also be strategically placed at specific locations of the electric power distribution system 10 to allow for successful communication in "noisy" environments, in which radio interference is present. In the depicted embodiment, interfering radio signals 28, which are transmitted to or from radio signal sources 30, may disrupt communication between communication nodes of the electric power distribution system 10. The interfering radio signals 28 represent undesirable radio signals from the perspective of the electric power distribution system 10, since the interfering radio signals 28 may interfere with the radio signals 22. The interfering radio signals 28 may originate from natural sources such as the sun, as well as from manmade sources such as the radio signal sources 30 (e.g., radio towers, cellular towers, wireless local area networks such as home Wi-Fi) installed around the electric power distribution system 10. In some cases, radio interference resulting from the interfering radio signals 28 may decrease a reliability of transmission of data between communication nodes of the electric power distribution system 10. Indeed, the interfering radio signals 28 may effectively compete with communication between the radio-enabled elements of the electrical power distribution system 10. To reduce communication blockage (e.g., disruption, interference) due to radio interference, the wireless radio repeaters 12 may boost (e.g., amplify) desired radio signals 22, so that a receiver (e.g., communication node) of the electric power distribution system 10 may detect the desired radio signal 22 even in locations with concentrations of interfering radio signals 28. As such, the desired radio signal 22 may be discernable by the receiver, reducing negative effects of transmitting radio signals 22 in areas with high interfering radio signal 28 concentration.

For example, wireless line sensor 14B may attempt to communicate with wireless radio repeater 12D. However, interfering radio signals 28 are in high concentration around the wireless radio repeater 12D, and may cause interference such that the communication of the wireless line sensor 14B with the wireless radio repeater 12D could be disrupted. The wireless radio repeater 12E may boost (e.g., amplify) the radio signals 22 that it receives from the wireless line sensor 14B. This may allow the wireless radio repeater 12D to discern the boosted radio signals 22 even though the wireless radio repeater 12D is near interfering radio signals 28. In some cases, the degree to which the wireless radio repeaters 12 may boost or not boost the wireless messages in the radio signals 22 may vary depending on the presence or absence of interfering radio signals 28. For example, if a wireless radio repeater 12 detects more than a threshold strength of interfering radio signals 28, the wireless radio repeater 12 may boost the radio signals 22 to a greater degree than otherwise. In another example, if a wireless radio repeater 12 detects more than a threshold strength of interfering radio signals 28 in the same frequency band as the radio signals 22 that are being received, the wireless radio repeater 12 may repeat the wireless message of the radio signals 22 in a different frequency band rather than the same frequency band (e.g., may negotiate with a downstream receiver a new frequency band over which to re-transmit wireless messages).

A failure of one or more transmissions of data (or respective portions of the data) may be costly due to the urgency of a control action that may be indicated by a sampling of a wireless line sensor 14. For example, electrical data indicative of a fault may need to be transmitted to the wireless line sensor collector 20 or the OMS or SCADA system 26 as soon as the fault is detected by the wireless line sensor 14. The failure of a successful transmission of such data may be costly and damaging. Thus, wireless radio repeaters 12 and wireless line sensors 14 may increase a likelihood of a successful transmission, so that control actions may be implemented by the OMS or SCADA system 26 close in time to the original transmission of the electrical data from a wireless line sensor 14.

In addition, the wireless radio repeaters 12 may be relatively easy to install. Indeed, the wireless radio repeaters 12 may be attached to the powerline (e.g., by hanging the wireless radio repeaters 12 on the power line), which may be much more cost effective than installing complex cabinetry or other structures (e.g., on a power pole). Moreover, coupling a wireless radio repeater 12 to the power line may allow the wireless radio repeater 12 to harvest energy wirelessly from the power line. For example, the enclosures of the wireless radio repeater 12 may include a loop that can be placed around the power line by which to hang the wireless radio repeater 12 that can also serve as a current transformer. In this capacity, the wireless radio repeater 12 may harvest energy by siphoning a small amount of power via the current transformer. In some cases, the harvested energy may be sufficient to power the wireless radio repeater 12.

Figure 2:
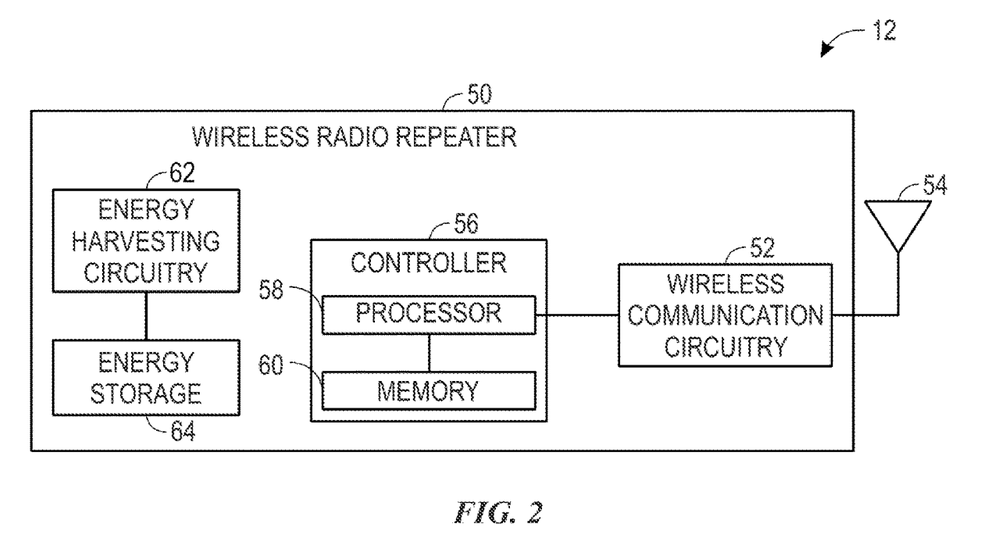
FIG. 2 is a block diagram illustrating various components that are included in a wireless radio repeater, in accordance with an embodiment.

FIG. 2 is a block diagram illustrating various components that may be included in the wireless radio repeater 12 of FIG. 1. In the illustrated embodiment, the wireless radio repeater 12 includes a wireless radio repeater enclosure 50 and a wireless communication circuitry 52. The wireless communication circuitry 52 is communicatively coupled to an antenna 54 that is integral and/or attached to the wireless radio repeater 12. In some cases, the wireless radio repeater 12 does not have a separate mounting structure for the integral antenna 54. In those cases, the antenna 54 of the wireless radio repeater 12 may be integrated into the wireless radio repeater 12. The antenna 54 may be specifically designed to detect certain radio frequencies and/or spatial directions. In some cases, the antenna 54 may be omnidirectional (e.g., the wireless radio repeater 12 may receive or re-transmit radio signals in many or all directions). In other embodiments, the antenna 54 of the wireless radio repeater 12 may be designed to receive or re-transmit radio signals in certain specific directions (e.g., corresponding to directions in which the wireless radio repeater 12 may receive messages from or re-transmit messages to in the electric power distribution system). Moreover, in some cases, the antenna 54 of the wireless radio repeater 12 may have multiple antenna elements that can be controlled as a phased array to receive or re-transmit radio signals in directions selected by the wireless communication circuitry 52 of the wireless radio repeater 12. The wireless radio repeater 12 may communicate with other wireless radio repeaters 12 in the same segment (e.g., power line or distribution line) on which it is installed or on different segments. Further, the wireless radio repeater 12 may receive a wireless message in a first wireless channel and then repeat the wireless message in a second wireless channel. The wireless radio repeater 12 may communicate with other wireless radio repeaters on similar sections (e.g., power lines) or on different sections of an electric power distribution system (e.g., the electric power distribution system 10 of FIG. 1).

The wireless radio repeater 12 includes a controller 56 (e.g., microcontroller) that has a processor 58 (e.g. microprocessor) and a memory 60. The memory 60 may be any suitable non-transitory, tangible, and computer readable medium storing instructions that may be executed by the processor 58. One or more processor(s) 58 may operate in concert with memory 60 to perform a variety of tasks. The memory 60 may represent any suitable article of manufacture that can store instructions executable by the processor 58 and/or data. For example, the memory 60 may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of machine-readable media suitable for storing electronic and/or processor-executable instructions.

Among other things, the processor 58 may operate according to the instructions stored in the memory 60 to receive, analyze (e.g., parse), and re-transmit radio signals it receives from other electrical devices (e.g., wireless line sensors, wireless radio repeaters, etc.) on an electric power distribution system. Specifically, the processor 58 may receive radio signals from the other electrical devices via the antenna(s) 54. The wireless communication circuitry 52 may include any suitable circuitry to communicate with a corresponding wireless communication system of a wireless line sensor collector 20 or another electrical device that is part of the electric power distribution system. For example, the wireless communication circuitry 52 may include suitable radio communication circuitry for communication via a personal area network (PAN), such as Bluetooth or ZigBee, a local area network (LAN), or wireless local area network (WLAN), such as an 802.11x Wi-Fi network, and/or a wide area network (WAN) (e.g., third-generation (3G) cellular, fourth-generation (4G) cellular, universal mobile telecommunication system (UMTS), long term evolution (LTE), long term evolution license assisted access (LTE-LAA), fifth-generation (5G) cellular, and/or 5G New Radio (5G NR) cellular).

The wireless communication circuitry 52 may include circuitry that allows the wireless radio repeater 12 to receive and/or re-transmit data packets to and from other wireless radio repeaters and/or other electronic devices. Also, the wireless communication circuitry 52 may include circuitry that allows the wireless radio repeater 12 to be selective in the radio signals it chooses to receive, analyze, or re-transmit. Such a filtering ability may be particularly useful, since other sources of radio waves may be detected by the wireless radio repeater 12. In order for the wireless radio repeater 12 to not repeat a radio signal that is not received from an electric device of the electric power distribution system 10 of FIG. 1 (e.g., another wireless radio repeater or another electronic device), for example, the wireless communication circuitry 52 may include circuitry that, in operation, is designed to filter out certain wavelengths (e.g., light wavelengths that are above and/or below one or more wavelength threshold values). In this way, the wireless radio repeater 12 may conserve energy, since it does not parse, re-transmit, and/or amplify radio signals that are characterized by a certain range of wavelengths that are in the filter-out range of the wireless communication circuitry. Such a filter mechanism may also decrease an amount of false radio signals received at a collection system (e.g., the wireless line sensor collector 20 or the OMS or SCADA 26 of FIG. 1).

In some embodiments, the wireless radio repeater 12 may receive data packets or only analyze data packets that are of a certain radio wave frequency. The wireless radio repeater 12 may receive data packets that include the electrical measurements and are characterized by a first frequency (e.g., a first frequency band), and then re-transmit the data packets at a second frequency (e.g., a second frequency band). In some cases, the wireless radio repeater 12 may re-transmit received radio signals in the analog domain received at a certain desired frequency (e.g., the frequency used by an electrical measurement device). In other cases, the wireless radio repeater 12 may parse the digital data contained in the messages of the radio signals and re-transmit the digital data, which may be result in fewer transmission errors as analog noise may be partially removed in this way. Moreover, additional digital information may be included in the re-transmitted signal to indicate that the wireless radio repeater 12 has re-transmitted the signal (e.g., a device identification number of the wireless radio repeater 12, a timestamp of the time the signal was originally received or when it was re-transmitted).

The wireless message that is received and/or re-transmitted by the wireless radio repeater 12 may be encrypted using any suitable encryption techniques. In some cases, the wireless radio repeater 12 may decrypt the message received from another electrical device on the electric power distribution system before re-transmitting the message. This may allow the wireless radio repeater 12 to determine, for example, the destination of the wireless message (e.g., if there are multiple control systems, which one; what frequency to use to re-transmit the message; a particular spatial direction to direct the antenna 54). If the wireless message is decrypted and parsed by the wireless radio repeater 12, the wireless radio repeater 12 may or may not re-encrypt the wireless message for re-transmission. When the wireless message is re-encrypted, the wireless radio repeater 12 may use the same encryption key and/or technique or a different encryption key and/or technique before re-transmitting the wireless message.

The wireless radio repeater 12 may primarily obtain power to operate via energy harvesting circuitry 62. The energy harvesting circuitry 62 may harvest energy from the power line where wireless radio repeater 12 is located. Most power lines are not enclosed, so a wireless radio repeater 12 may be attached or clamped to a power line via any suitable coupling. The wireless radio repeater 12 may siphon a small amount of current using an inductive coil. The wireless radio repeater 12 may store the energy it harvests using any suitable energy storage 64. The energy storage 64 may include, for example, a capacitor, a supercapacitor, a battery, a flywheel, or any other suitable form of storage.

Although the amount of energy harvested by the energy harvesting circuitry 62 represents a negligible amount of energy supplied by the electric power distribution system 10 of FIG. 1 as a whole, by gradually filling the energy storage 64 from energy harvested from the power line, the wireless radio repeater 12 may store enough energy to perform numerous tasks. For example, the wireless radio repeater 12 may use the energy to operate the wireless communication circuitry 52.

The wireless radio repeater 12 may also contain emergency batteries to provide energy when the distribution line that the wireless radio repeater 12 is coupled to (e.g., attached or clamped) does not have sufficient current flow for a long enough time so as to drain the energy storage 64. For example, if the distribution line does not have enough power to make the wireless radio repeater 12 operate within operational limits, power may be harvested from other (e.g., secondary) sources such as solar energy, kinetic energy from a motion of the distribution line the wireless radio repeater 12 is connected to, or other energy source in the immediate environment of the wireless radio repeater 12. In this way, the wireless radio repeater 12 may re-transmit alerts even when the distribution line it is mounted on does not have sufficient current.

Since power that may run to the wireless radio repeater 12 is primarily harvested from the distribution line via induction, equipment to step down the voltage of the distribution line to power the wireless radio repeater 12 may be avoided. Moreover, when the wireless radio repeater 12 does not include wiring to a separate antenna or power source, electrical surge protection for the wireless radio repeater 12 may also be avoided. In this way, the wireless radio repeater 12 offers an efficient method of transmission of wireless messages (e.g., radio signals of data packets) that include electrical measurements to other communication nodes (e.g., other wireless radio repeaters), thereby avoiding expensive structural elements (e.g., cabinetry, standalone structures). However, the wireless radio repeaters 12 may, in some cases, be installed using such separate structural elements.

Figure 3:
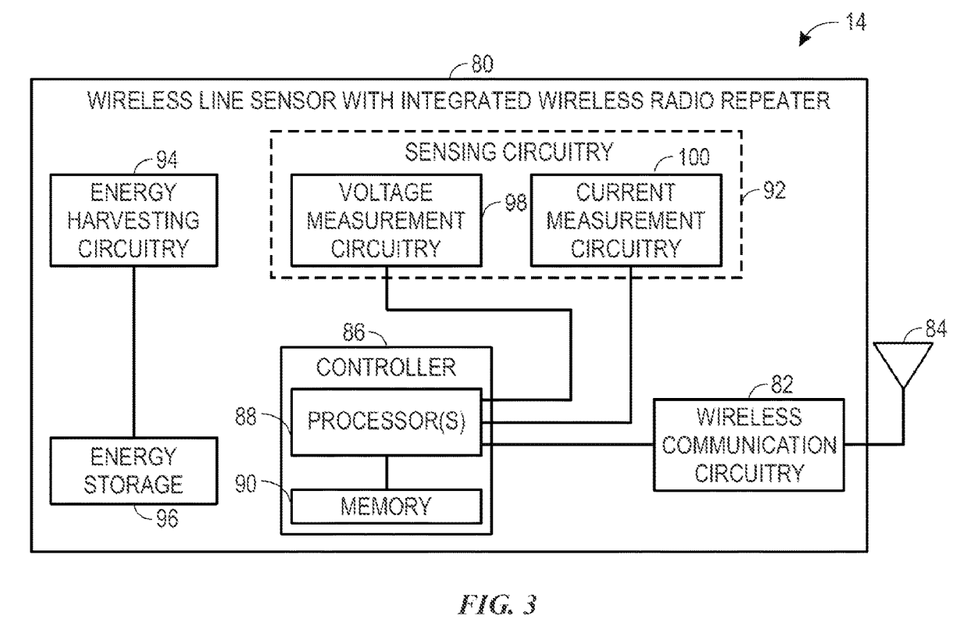
FIG. 3 is a block diagram illustrating various components that are included in a wireless line sensor having an integrated radio repeater, in accordance with an embodiment.

FIG. 3 is a block diagram of a wireless line sensor 14 of FIG. 1 having an integrated wireless radio repeater. Indeed, the wireless line sensors 14 of FIG. 1 may or may not include integrated wireless radio repeater capabilities. In the illustrated embodiment, the wireless line sensor 14 of FIG. 3 includes wireless radio repeater capabilities. As shown, the wireless line sensor 14 includes a wireless line sensor enclosure 80 and a wireless communication circuitry 82. The wireless communication circuitry 82 may operate an antenna 84. The wireless communication circuitry 82 and the antenna 84 may operate in the same or a similar manner as the wireless communication circuitry 52 and antenna 54 discussed above with reference to FIG. 2. In this way, the wireless line sensor 14 may be understood to have integrated wireless radio repeater capabilities (e.g., capabilities of the wireless radio repeater 12).

The wireless line sensor 14 includes a controller 86 (e.g., microcontroller) that has a processor 88 (e.g. microprocessor) and a memory 90. The memory 90 may be a non-transitory, tangible, and computer readable medium storing instructions that may be executed by the processor 88. Specifically, one or more processor(s) 88 may operate in concert with memory 90 to perform a variety of tasks. The memory 90 may represent any suitable article of manufacture that can store instructions executable by the processor 88 and/or data. For example, the memory 90 may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of machine-readable media suitable for storing electronic and/or processor-executable instructions.

Among other things, the processor 88 may operate according to these instructions to transmit electrical measurements obtained by sensing circuitry 92 (e.g., electrical measurement circuitry), which is discussed further below. The processor 88 may analyze the electrical measurements obtained by the sensing circuitry 92 and transmit these determine a frequency at which to transform or parse the electrical measurement data into a wireless message (e.g., data packets in a wireless message) that may be transmitted by the wireless communication circuitry 82. The processor 88 may, additionally or alternatively, receive, analyze (e.g., parse), and re-transmit radio signals it receives from other electrical devices (e.g., other wireless line sensors and wireless radio repeaters 12). The wireless communication circuitry 82 may include any suitable circuitry to communicate with a corresponding wireless communication system of a wireless line sensor collector 20 or another electrical device part of the electric power distribution system 10 of FIG. 1. For example, the wireless communication circuitry 82 may include suitable radio communication circuitry for communication via a personal area network (PAN), such as Bluetooth or ZigBee, a local area network (LAN), or wireless local area network (WLAN), such as an 802.11x Wi-Fi network, and/or a wide area network (WAN) (e.g., third-generation (3G) cellular, fourth-generation (4G) cellular, universal mobile telecommunication system (UMTS), long term evolution (LTE), long term evolution license assisted access (LTE-LAA), fifth-generation (5G) cellular, and/or 5G New Radio (5G NR) cellular).

The wireless line sensor 14 may primarily obtain power to operate via energy harvesting circuitry 94. The energy harvesting circuitry 94 may harvest energy from the distribution line where the wireless line sensor 14 is located. Most power lines are not enclosed, so a wireless line sensor 14 may be attached or clamped to a power line via any suitable coupling. The wireless line sensor 14 may syphon a small amount of current using an inductive coil. The wireless line sensor 14 may store the energy harvests using any suitable energy storage 96. The energy storage 96 may include, for example, a capacitor, a supercapacitor, a battery, a flywheel, or any other suitable form of storage.

Although the amount of energy harvested by the energy harvesting circuitry 94 represents a negligible amount of energy supplied by the electric power distribution system as a whole, by gradually filling the energy storage 96 from energy harvested from the distribution line, the wireless line sensor 14 may store enough energy to perform numerous tasks. For example, the wireless line sensor 14 may use the energy to operate the wireless communication circuitry 82. Also, the wireless line sensor 14 may use the energy it harvests to operate the sensing circuitry 92, such as voltage measurement circuitry 98 and current measurement circuitry 100. The voltage measurement circuitry 98 may use one or more capacitive elements to estimate voltage on a distribution line. The capacitive elements may step down the voltage on the distribution line to a level that can be measured by a metering circuit of the voltage measurement circuitry 98. The current measurement circuitry 100 may include a coil that may be looped around the distribution line when the wireless line sensor 14 is clamped around it. The current measurement circuitry 100 may measure the resulting electrical current induced in the coil using metering circuitry; the induced current is proportional to the current flowing through the distribution line.

The wireless line sensor 14 may also contain emergency batteries to provide energy when the distribution line that the wireless line sensor 14 is coupled to (e.g., attached or clamped) does not have sufficient current flow for a long enough time so as to drain the energy storage 96. For example, if the distribution line does not have enough power to make the wireless line sensor 14 operate within operational limits, power may be harvested from other (e.g., secondary) sources such as solar energy, kinetic energy from a motion of the distribution line the wireless line sensor is connected to, or other energy source in the immediate environment of the wireless line sensor 14. In this way, the wireless line sensor 14 may be powered to transmit or re-transmit alerts (e.g., data packets indicative of electrical measurements) even when the distribution line it is mounted to does not have sufficient current. As an example, the wireless line sensor 14 may sample electrical measurements even when the distribution line it is mounted to is not receiving power. Such a case may indicate that the distribution line is "dead" or that a fault may exist near the distribution. In this case, it is desirable for the wireless line sensor 14 to transmit alerts indicating the lack of power in the pertinent location, and to re-transmit (e.g., repeat) alerts received from other electronic devices located on other sections of the electric power distribution system. Indeed, such a continuous transmission may allow a central source that analyzes the alerts to isolate a location of a fault and perform control actions at the isolated location, for example. The wireless line sensor 14 may access other energy harvesting sources to continue to operate, detect the current or voltage in the distribution line, and transmit or re-transmit alerts comprising data originating at the wireless line sensor 14 or at another electrical measurement device (e.g., another wireless line sensor).

Figure 4:
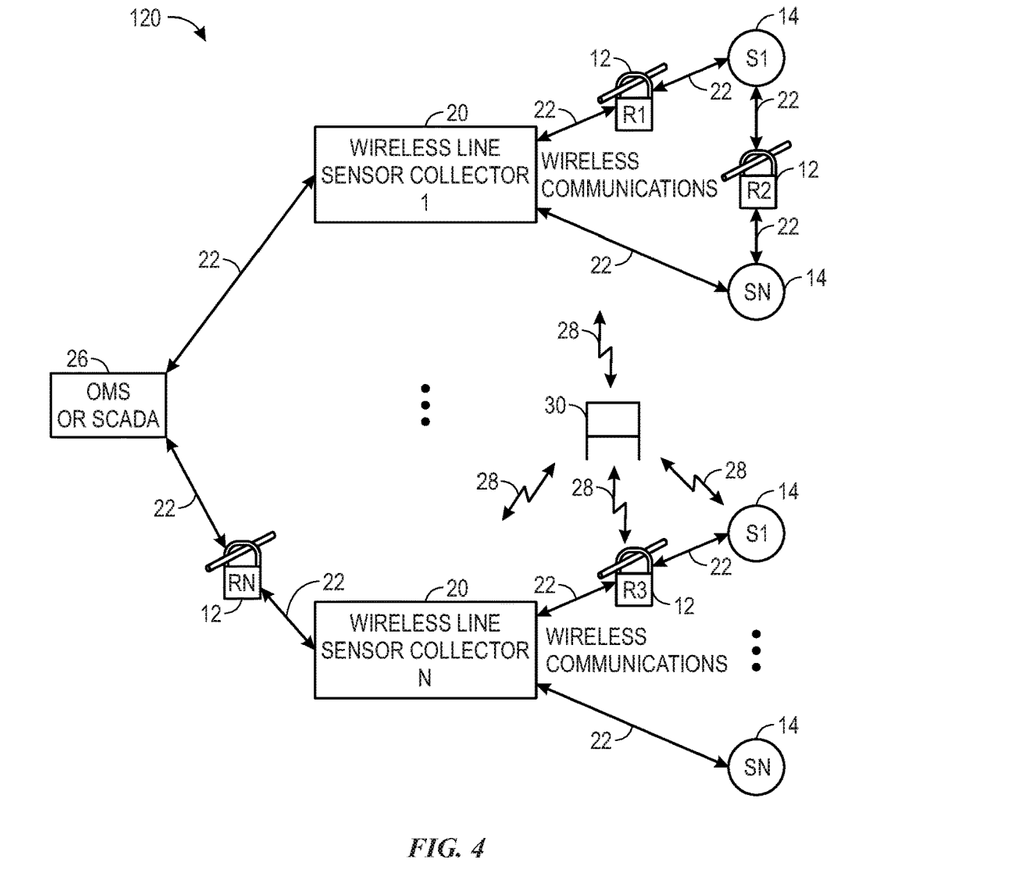
FIG. 4 is a simplified architectural view of communication between components of the electric power distribution system using wireless radio repeaters, in accordance with embodiment.

FIG. 4 is a simplified architectural view of communication between nodes of an electrical distribution communication network 120 (e.g., communication network) of an electric power distribution system using wireless radio repeaters 12 to aid in the communication. In particular, FIG. 4 is a diagram of the relationship between the Outage Management System (OMS) or Supervisory Control and Data Acquisition (SCADA) system 26, wireless line sensor collectors 20, wireless radio repeaters 12, and wireless line sensors 14. The Outage Management System (OMS) or Supervisory Control and Data Acquisition (SCADA) system 26 may communicate with some number of wireless line sensor collectors 20 using the radio signals 22 or a wired communication medium (not shown). Here, there are shown to be "N" wireless line sensor collectors 20 labeled 1 . . . N. Each wireless line sensor collector 20 may communicate with some number of wireless line sensors 14 via the radio signals 22. Here, there are also shown to be "N" wireless line sensors 14 labeled S1 . . . SN for each wireless line sensor collector 20. However, the particular number "N" of wireless line sensors 14 may or may not be the same as the number "N" of wireless line sensor collectors 20. Moreover, there may be different number "N" wireless line sensors 14 per each wireless line sensor collector 20.

Disposed between communication nodes of the communication network are wireless radio repeaters 12 that receive and re-transmit radio signals 22 to and from the OMS or SCADA 26, wireless line sensor collectors 20, and wireless line sensors 14. Specifically, the wireless radio repeaters 12 are disposed in strategic locations so as to minimize an amount of obstacles that would decrease or attenuate a strength of a radio signal 22 that is transmitted on the communication network of the electric power distribution system. Indeed, it may be preferable for wireless radio repeaters 12 to have line of sight communication paths with communication nodes on any side of the wireless radio repeater 12 to increase a reliability of transmission of data packets comprising the electrical measurement data on the electrical distribution communication network. Any number of wireless radio repeaters 12 may be included in the communication network.

By strategically placing the wireless radio repeaters in locations that optimize the line of sight use, a threshold percentage of successful transmissions may be increased. The threshold percentage may be, for example, from 50% to 75%, 60 to 80%, or from 75% to 99%. Also, the data packets transmitted by nodes of the electrical distribution communication network 120 may arrive at a desired location with less distortion or attenuation than if the wireless line sensor 14 or wireless line sensor collector 20 was transmitting data packets without wireless radio repeaters 12 placed in strategic locations because the data packets may not be attenuated much as compared with an attempted transmission through an obstacle to radio frequencies. Thus, control actions may be taken sooner, since the data packets may arrive at the intended destination in a reliable and timely manner. For example, a fault may be identified in a specific location along the electric power distribution system. A wireless line sensor 14 may detect current and/or voltage measurements indicative of the fault, but may not be able to reliably transmit data packets comprising the current and/or voltage measurements to the wireless line sensor collector 20. A low cost wireless radio repeater 12 may be strategically placed such that it has a line of sight view with the wireless line sensor collector 20 or another electronic device having an integrated wireless radio repeater (e.g., a wireless radio repeater 12 or another wireless line sensor 14) that has a line of sight communication path with the wireless line sensor collector 20. The wireless line sensors 14 may send the data packets to the wireless radio repeater 12, which may in turn, re-transmit the data packets to the wireless line sensor collector 20 and/or another wireless radio repeater 12 that it may have a line of sight communication path with. This process of transmission may continue until the data packets arrive at the wireless line sensor collector 20 or another centralized location (e.g., OMS or SCADA 26). In this way, obstacles that would impede a successful transmission of the data packets may be reduced or avoided.

Further, in the depicted embodiment, concentrations of interfering radio signals 28 may occur near communication nodes of the communication network. In particular, the interfering radio signals 28 (e.g., interference signals) are being transmitted and received by the radio signal source 30. Although the depicted embodiment illustrates a single radio signal source 30, multiple radio signal sources 30 may be present around various locations of communication nodes of the communication network. Interfering radio signals 28 may cause disruptions in successful reception of the radio signals 22 at the communication nodes. To mitigate the negative effects of interfering radio signals 28, the wireless line repeaters 12 may boost or amplify (e.g., via an amplifier) radio signals 22 to increase successful reception of radio signals 22 in the presence of the undesirable interfering radio signals 28. Boosting the radio signals 22 may increase successful reception of radio signals 22 with a communication node of the communication network in that is near the interfering radio signals 28. The wireless radio repeater 12 may also selectively repeat wireless messages, resulting in greater connectivity and reception amongst elements of the communication network. In some embodiments, the wireless radio repeater may be located in a threshold distance to a communication node. At the threshold distance, the wireless radio repeater 12 may boost the radio signals 22 so that an intended receiver of the radio signals 22 may discern the radio signals 22 from the interfering radio signals 28.

Figure 5:
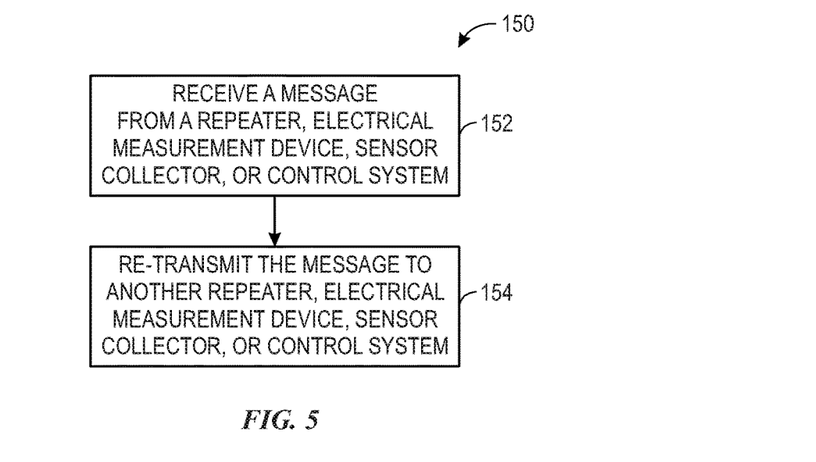
FIG. 5 is a flowchart of a method for receiving and re-transmitting a wireless message via a wireless radio repeater, in accordance with an embodiment.

FIG. 5 is a flowchart of a method 150 for receiving and re-transmitting a wireless message (e.g., an electrical measurement message) via a wireless radio repeater, in accordance with an embodiment. The method 150 may also be performed by a device that has an integrated wireless radio repeater such as a wireless line sensor having an integrated wireless radio repeater (e.g., the wireless line sensor 14 of FIG. 1). The method 150 begins with receiving (block 152) a wireless message (e.g., radio signals including data packets) from a wireless radio repeater, wireless line sensor (e.g., electrical measurement device), wireless line sensor collector, or control system. The wireless message may be received at a specific frequency (e.g., frequency band) and/or from a specific spatial direction at which the wireless radio repeater is tuned to listen for. The wireless radio repeater may then re-transmit the wireless message to another repeater, wireless line sensor collector, electrical measurement device, or control system (block 154). For example, the wireless radio repeater may amplify and re-transmit the wireless message so that it can be detected by a wireless line sensor collector 20, the OMS or SCADA system 26, or another wireless radio repeater (e.g., a stand-alone wireless radio repeater or a wireless line sensor with radio repeater capabilities).

In some cases, the wireless radio repeater may receive the wireless message at a first frequency (e.g., a first frequency band) and may re-transmit the wireless message at a second frequency (e.g., a second frequency band). Likewise, the wireless radio repeater may receive the wireless message from a first spatial direction (e.g., as sensed on a phased array of antenna elements or a first directional antenna) and may re-transmit the wireless message toward a second spatial direction (e.g., as transmitted via a phased array of antenna elements or a second directional antenna). The particular second frequency or second spatial direction may be fixed (e.g., programmed during installation) or may be dynamic (e.g., depending on which electrical measurement device obtained the electrical measurements of the wireless message, the type of electrical measurement of the wireless message). A wireless radio repeater may be tuned to re-transmit data packets at different frequencies or in different spatial directions based on attributes of the wireless messages (e.g., the first frequency, content of the wireless message). For example, a wireless message may include an alert of a particular type, and the second frequency or spatial direction may be selected based on the characteristics of the alerts.

While specific embodiments and applications of the disclosure have been illustrated and described, it is to be understood that the disclosure is not limited to the precise configurations and components disclosed herein. For example, the systems, devices, and instructions described herein may be applied to other communication networks. The wireless radio repeaters may be coupled to distribution lines in locations that optimize successful transmission of data on these different networks. For example, wireless radio repeaters may repeat messages that are transmitted on a WiFi network. A benefit of the systems and methods of this disclosure may be an efficient, reliable connection in an environment that contains one or more obstacles to radio frequency transmissions. Accordingly, many changes may be made to the details of the above-described embodiments without departing from the underlying principles of this disclosure. The scope of the present disclosure should, therefore, be determined by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is intended to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . ", it is intended that such elements are to be interpreted under 35 U.S.C. 112(f). For any claims containing elements designated in any other manner, however, it is intended that such element are not to be interpreted under 35 U.S.C. 112(f).

What is claimed is:

1. A system comprising:
an electrical measurement device configured to be installed on a first power line of an electric power distribution system, obtain an electrical measurement of the first power line of the electric power distribution system, and transmit a wireless message indicating the electrical measurement, wherein the electrical measurement comprises a current measurement, a voltage measurement, or both of electricity flowing through the first power line; and
a wireless radio repeater configured to be installed on the first power line or a second power line, receive the wireless message from the electrical measurement device, and wirelessly re-transmit the wireless message to either or both of:
 a control system of the electric power distribution system located apart from the first power line of the electrical measurement device; and
 another wireless radio repeater installed on the second power line or a third power line of the electric power distribution system to assist in sending the wireless message to the control system of the electric power distribution system.

2. The system of claim 1, wherein the wireless radio repeater comprises another electrical measurement device configured to obtain another electrical measurement of the first power line or the second power line and wirelessly re-transmit another wireless message indicating the other electrical measurement.

3. The system of claim 1, wherein the wireless radio repeater is configured to receive the wireless message at a first frequency and wirelessly re-transmit the wireless message at a second frequency.

4. The system of claim 1, wherein the wireless message comprises multiple data packets.

5. The system of claim 1, wherein the wireless radio repeater is configured to wirelessly re-transmit an additional wireless message from the control system.

6. The system of claim 1, comprising the other wireless radio repeater, wherein the other wireless radio repeater is configured to receive the wireless message from the wireless radio repeater and wirelessly re-transmit the wireless message to assist in sending the wireless message to the control system.

7. The system of claim 6, wherein the other wireless radio repeater is configured to wirelessly re-transmit the wireless message to the control system.

8. The system of claim 1, wherein the wireless radio repeater is configured to broadcast the wireless message.

9. The system of claim 1, wherein the wireless radio repeater is configured to direct the wireless message to the other wireless radio repeater or the control system using a directional antenna or phased antenna array.

10. The system of claim 1, wherein the wireless radio repeater is configured to boost the wireless message and wherein wirelessly re-transmitting the wireless message comprises wirelessly re-transmitting the boosted wireless message.

11. The system of claim 1, wherein the wireless radio repeater is located within a threshold distance of the control system of the electric power distribution system or the other wireless radio repeater to or from which the wireless radio repeater wirelessly re-transmits the wireless message.

12. The system of claim 1, wherein the wireless radio repeater is configured to:
determine respective wavelengths of received signals;
filter a first wavelength based on the first wavelength being above or below a threshold range of wavelengths to avoid transmitting an associated received signal having the first wavelength; and
wirelessly re-transmit the wireless message based on a second wavelength of the wireless message being within the threshold range of wavelengths.

13. A wireless radio repeater comprising:
coupling configured to attach the wireless radio repeater to a first power line of an electric power distribution system;
a current transformer configured to harvest electrical energy from the first power line;
an antenna configured to receive a wireless message from an electrical measurement device installed on a second power line, wherein the wireless message comprises an indication of a fault based at least in part on an electrical measurement of the second power line, wherein the fault indicates an amount of current, an amount of power, or both is below a threshold value; and
wireless communication circuitry powered at least in part by the harvested electrical energy, wherein the wireless communication circuitry is configured to cause the antenna to re-transmit the wireless message.

14. The wireless radio repeater of claim 13, wherein the antenna is configured to receive the wireless message in a first wireless channel and wherein the wireless communication circuitry is configured to cause the antenna to re-transmit the wireless message in a second wireless channel.

15. The wireless radio repeater of claim 13, wherein the antenna is configured to receive the wireless message from a first direction and wherein the wireless communication circuitry is configured to cause the antenna to re-transmit the wireless message in a second direction.

16. The wireless radio repeater of claim 13, wherein the fault indicated by the wireless message indicates the electrical measurement, the electrical measurement is associated with an operation of a component of the electric power distribution system, and the electrical measurement is obtained by the electrical measurement device.

17. The wireless radio repeater of claim 13, comprising electrical measurement circuitry configured to obtain the electrical measurement of the first power line where the wireless radio repeater is located.

18. The wireless radio repeater of claim 17, wherein the electrical measurement circuitry is configured to obtain an additional electrical measurement of an operation of a component of the electric power distribution system, and wherein the electrical measurement of the first power line or the additional electrical measurement of the operation of the component comprises a current measurement, a voltage measurement, or both.

19. The wireless radio repeater of claim 13, wherein the wireless radio repeater is configured to boost the wireless message and wherein the wireless communication circuitry is configured to cause the antenna to re-transmit the boosted wireless message.

20. An article of manufacture comprising one or more tangible, non-transitory, computer-readable media having stored thereon instructions that, when executed, cause a processor to:
receive, via an antenna of a wireless radio repeater installed on a first power line of an electric power distribution system, a wireless message comprising data that indicates an electrical property of a component of the electric power distribution system;
determine, via circuitry of the wireless radio repeater, a wavelength of a signal comprising the wireless message;
filter, via the circuitry, the wavelength of the signal based on the wavelength being above or below a threshold range of wavelengths to avoid re-transmission of the wireless message; and
re-transmit, via the antenna of the wireless radio repeater installed on the first power line of the electric power distribution system and in response to determining that the wavelength of the signal is within the threshold range of wavelengths via the circuitry, the wireless message to either or both of:
a control system of the electric power distribution system located apart from the first power line; and
another wireless radio repeater installed on a second power line of the electric power distribution system to assist in sending the wireless message to the control system of the electric power distribution system.

21. The article of manufacture of claim 20, wherein:
the instructions to receive the wireless message comprise instructions to receive the wireless message in a first frequency band; and
the instructions to re-transmit the wireless message comprise instructions to re-transmit the wireless message in a second frequency band.

22. The article of manufacture of claim 20, wherein the instructions to re-transmit the wireless message comprise instructions to re-transmit the wireless message in a spatial direction toward the other wireless radio repeater or the control system.

\* \* \* \* \*